UNITED STATES PATENT OFFICE.

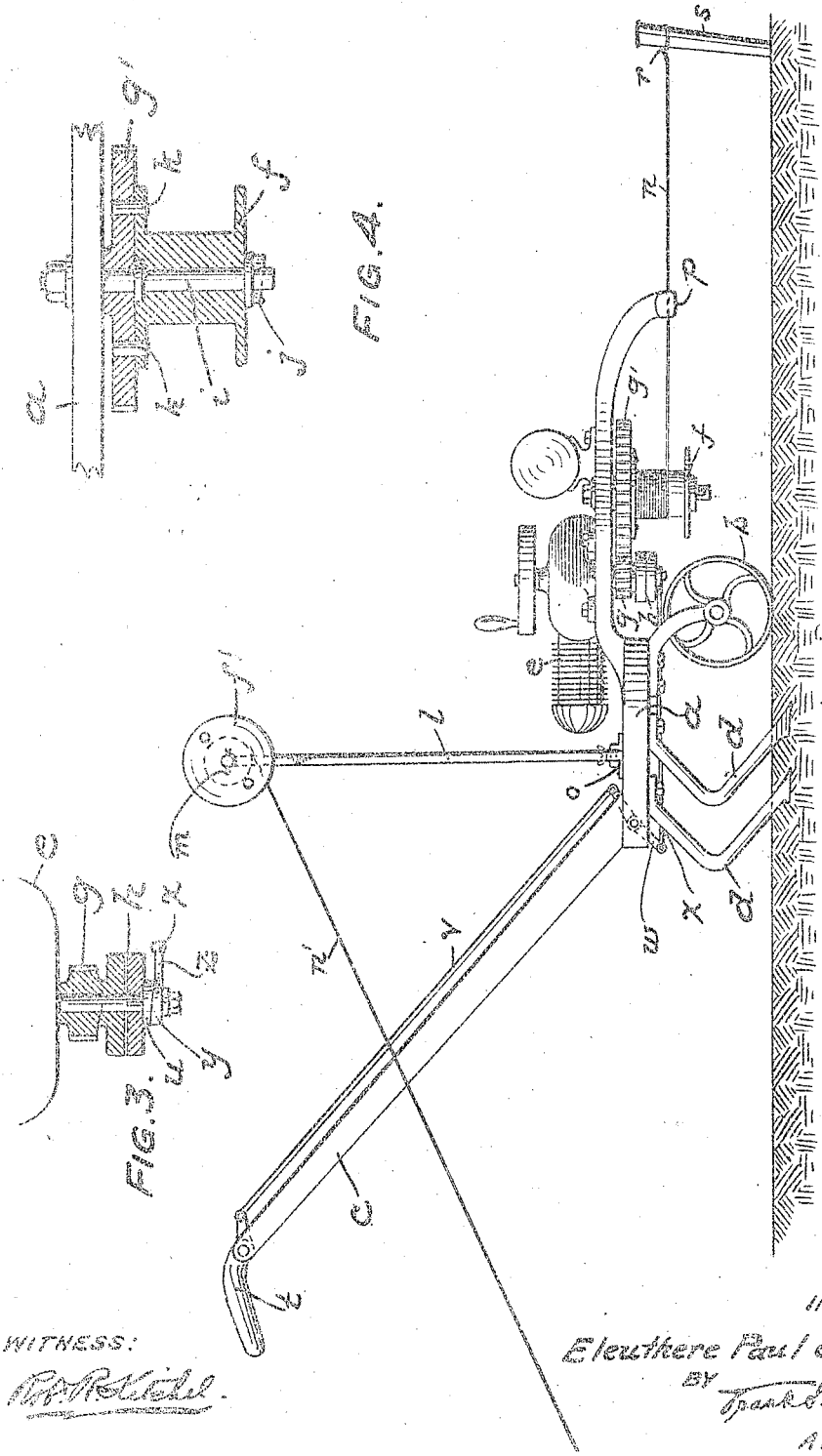

ELEUTHERE PAUL du PONT, OF MONTCHANIN, DELAWARE.

POWER-DRIVER FOR AGRICULTURAL IMPLEMENTS.

1,291,801.   Specification of Letters Patent.   Patented Jan. 21, 1919.

Application filed October 25, 1917. Serial No. 198,495.

*To all whom it may concern:*

Be it known that I, ELEUTHERE PAUL DU PONT, a citizen of the United States, residing at Montchanin, county of New Castle, and State of Delaware, have invented a new and useful Improvement in Power-Drivers for Agricultural Implements, of which the following is a full, clear, and exact description, reference being had to the accompanying drawings, which form a part of this specification.

The object of my invention is to provide a power agricultural implement which will be light in weight and combine all the advantages of a hand implement with the use of power to the end that it may be used in small kitchen gardens as well as in larger truck gardens.

A further object of my invention is to so construct the implement as to render the power efficient regardless of the lack of traction of the wheels due to lightness; also to construct the implement at a cost which will place it within the reach of all classes of gardeners.

Referring to the accompanying drawings in which I have illustrated a preferred embodiment of my invention—

Fig. 2 is a side elevation of the subject-matter of Fig. 1.

Fig. 3 is a detail of the clutch.

Fig. 4 is a detail of the winding drum.

Figure 1:
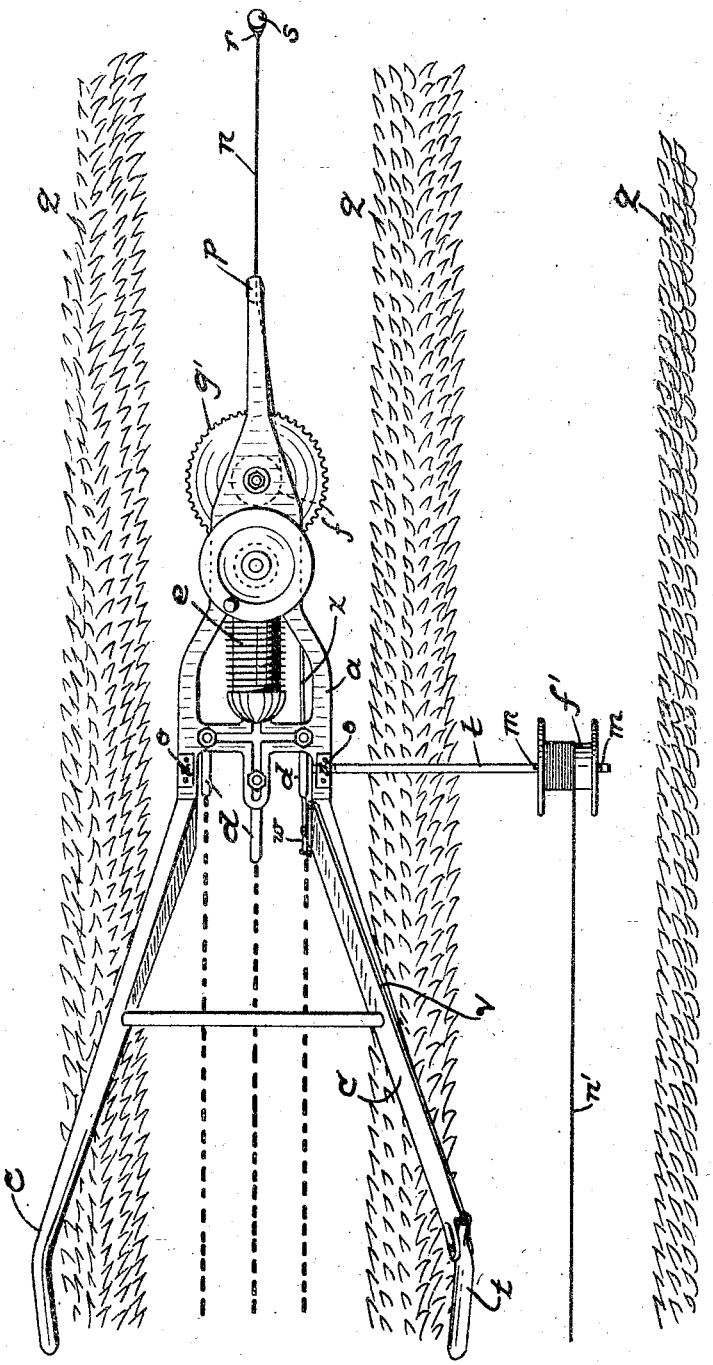
Figure 1 is a plan view of my invention applied to a cultivator.

The frame $a$ is provided with the wheel $b$ and handles $c$. Beneath the frame are detachably fastened the cultivator teeth $d$. On the frame is mounted the light gasolene engine $e$ connected with the winding drum $f$ by a pair of gears $g$ and $g'$ and the friction clutch $h$, one member of which is fixed to the engine shaft while the other carries the gear $g$. The winding drum is held in connection with the gear $g'$ by means of the shaft $i$ and retaining key $j$; the drum is driven through the pins $k$, which project from the gear $g'$ and enter holes in the flange of the drum.

To the frame at any convenient point is fastened the arm $l$ which carries the winding drum $f'$ at its end, the drum being held in position by the pins $m$. The frame is provided as at $o$ with means for fastening the arm $l$ on either side of the frame.

The front end of the frame is provided with the lip $p$, which acts as a guide for the flexible cable $n$ carried by the drum $p$. The cable $n$ is provided with a ring or loop $r$ at one end, which is adapted to pass over and fasten the cable to a stake $s$ driven into the ground. The drum $f'$ carries the cable $n'$ provided with a ring or loop adapted to pass over and fasten the cable to a stake, as in the case of the cable $n$.

The drums $f$ and $f'$ are similar and interchangeable and the arm $l$ may be readily changed from one side to the other of the frame.

The hand lever $t$ is pivoted to one of the handles $c$ and is connected to the friction clutch $h$ by means of the link $v$, the bell crank $w$ fastened to the frame and the link $x$, which connects with the arm $z$ on the cam $y$, movement of which causes the clutch faces to engage or disengage under the action of the cams $y$ and $u$. The clutch is engaged or disengaged by manipulation of the hand lever $t$.

In operation the implement is used, for example, in cultivating between rows of vegetables $q$ in the following manner: The stake $s$ is driven into the ground at the opposite end of the row from the point where cultivation is to start, the cable $n$ is run out and the ring $r$ passed over the stake. A similar stake is now driven at the end of the next adjoining row, nearest the start; the cable $n'$ is then fastened to this stake. The drums $f$ and $f'$ are then fastened to the gear $g'$ and the arm $l$ respectively.

The engine is then started and the clutch is engaged by the hand lever $t$. The engine then causes the drum $f$ to wind in the cable $n$, thus drawing the cultivator toward the stake $s$. At the same time the cable $n'$ is unwound from the drum $f'$.

When the stake $s$ is reached, it is drawn out and the drum $f$ removed by withdrawing the retaining key $j$ and slipping it off of the shaft $i$; at the same time the drum $f'$ is removed from the arm $l$. The cultivator is now moved to the next row along which the cable $p'$ lies and faced in the opposite direction. The stake $s$ is driven into the ground at the end of the adjoining row. The drum $f$ is now placed on the arm $l$ which is moved to the opposite side of the frame, and the drum $f'$ fastened to the gear $g'$; the clutch is engaged and the cable $p'$ wound in, causing the cultivator to again traverse the garden. The same operation is repeated until the necessary cultivation is completed.

I do not desire to limit myself to a cultivator, as it is obvious that the cultivator teeth may be replaced by plows, harrow disks, rakes, etc., or seeding devices.

Having now fully described my invention, what I desire to claim and protect by Letters Patent is:

1. In a power driver for agricultural implements, the combination with a vehicle for carrying the implement, of a drum on the vehicle, a cable on the drum adapted for attachment at one end to a relatively fixed support, a motor on the vehicle, a clutch operable to connect and disconnect the motor and the drum, handles extending rearwardly from the vehicles, and a manually operative connection from one handle to the clutch for operating the latter.

2. In a power driver for agricultural implements, the combination with a vehicle for carrying the implement, of a drum on the vehicle, a cable on the drum extending therefrom longitudinally in one direction and adapted for attachment to a relatively fixed support, a motor on the vehicle, means to place the motor in driving relation with the drum so as to wind the cable and thereby propel the vehicle toward said support, and a second cable carried by the vehicle and adapted to be unwound in the travel of the vehicle and laid in a direction parallel to the direction of extension of the first cable.

3. In a power driver for agricultural implements, the combination with a motor, of a drum connected with and adapted to be driven by the motor, a cable on the drum adapted to extend therefrom in one longitudinal direction to a fixed support, a second drum arranged out of longitudinal alinement with the first drum, and a cable on the second drum adapted to extend therefrom in the opposite longitudinal direction to a fixed support.

4. In a power driver for agricultural implements, the combination with a vehicle for carrying the implement, of exchangeable drums on the vehicle, cables on the drums extending therefrom in respectively opposite directions, a motor on the vehicle, and a clutch operable to connect the motor and one of the drums.

5. In a power driver for agricultural implements, the combination with a vehicle for carrying the implement, of exchangeable drums on the vehicle, cables on the drums extending therefrom in respectively opposite directions, a motor on the vehicle, a handle on the vehicle, a clutch operable to connect and disconnect the motor and one of the drums, and connections from the handle to the clutch for operating the latter.

6. In a power driver for agricultural implements, the combination with a vehicle for carrying the implement, of a motor carried by the vehicle, a drum carrier, means to secure said drum carrier to the vehicle in either of two different positions so that the carrier will project on one side or the other thereof, gearing adapted to be driven by the motor, a clutch operable to connect and disconnect the motor from its gearing, exchangeable drums securable either to the carrier or to the gearing, and cables carried by each drum, whereby the winding of one cable by the drum will pull the vehicle in one direction while simultaneously the other cable will be unwound and laid in a direction parallel to the travel of the vehicle.

In testimony of which invention, I have hereunto set my hand, at Wilmington, Delaware, on this 19th day of October, 1917.

ELEUTHERE PAUL du PONT.